US012285365B1

(12) United States Patent
Guynup

(10) Patent No.: US 12,285,365 B1
(45) Date of Patent: Apr. 29, 2025

(54) SYSTEM AND METHOD FOR A MODULAR HYPERBARIC CHAMBER HAVING A REVERSIBLE SECTION

(71) Applicant: Luke Guynup, Mobile, AL (US)

(72) Inventor: Luke Guynup, Mobile, AL (US)

( * ) Notice: Subject to any disclaimer, the term of this patent is extended or adjusted under 35 U.S.C. 154(b) by 0 days.

(21) Appl. No.: 18/731,652

(22) Filed: Jun. 3, 2024

Related U.S. Application Data

(63) Continuation of application No. 18/628,645, filed on Apr. 5, 2024.

(51) Int. Cl.
*A61G 10/00* (2006.01)
*A61G 10/02* (2006.01)

(52) U.S. Cl.
CPC ........ *A61G 10/026* (2013.01); *A61G 2203/20* (2013.01)

(58) Field of Classification Search
CPC .................................................... A61G 10/026
See application file for complete search history.

(56) References Cited

U.S. PATENT DOCUMENTS 3,587,574 A * 6/1971 Mercer ................ A61G 10/026 128/205.26
3,877,427 A * 4/1975 Alexeev ............... A61G 10/026 128/202.13
4,633,859 A * 1/1987 Reneau ................ A61G 10/026 128/205.26
4,727,870 A * 3/1988 Krasle .................. A61G 10/026 128/205.26
4,876,773 A * 10/1989 Wade ................. A61G 13/0027 5/629
5,060,644 A * 10/1991 Loori ................... A61G 10/026 128/205.26
5,618,126 A * 4/1997 Watt ..................... A61G 10/026 403/3
5,678,543 A * 10/1997 Bower ................... A62B 31/00 128/205.26
5,685,293 A * 11/1997 Watt ....................... A61M 16/10 128/205.26
6,241,653 B1 * 6/2001 Gauger ................ A61G 10/005 600/21
9,186,232 B1 * 11/2015 Otto ..................... A61G 10/026
(Continued)

*Primary Examiner* — LaToya M Louis
(74) *Attorney, Agent, or Firm* — AdamsIP, LLC.; Edward Brinkley Garner, III; James Hunter Adams

(57) ABSTRACT

A modular hyperbaric chamber system with a reversible control section is disclosed, providing enhanced flexibility in chamber placement and orientation within various spatial constraints. The system includes a modular cylindrical vessel composed of a cylindrical body section, a head section, and a door section, with the body section featuring a reversible control section. This reversible control section, equipped with mirrored control inlets and windows, allows for 180-degree rotation, altering the chamber's orientation. The chamber maintains an internal pressure of at least 3 atmospheres and includes a flow control system for oxygen transfer from an external source into the chamber. A control panel with a housing and multiple controls is operably connected to the flow control system and can be secured to either the interior or exterior mirrored control inlets. The system's design accommodates custom configurations and ensures patient and operator convenience and safety.

20 Claims, 8 Drawing Sheets

(56) References Cited

U.S. PATENT DOCUMENTS

| | | | | |
|---|---|---|---|---|
| 11,564,852 | B2 * | 1/2023 | Delise | B62D 33/02 |
| 2004/0261796 | A1 * | 12/2004 | Butler | A61G 10/026 128/205.26 |
| 2005/0109381 | A1 * | 5/2005 | Mosteller | A61G 10/026 135/97 |
| 2008/0210239 | A1 * | 9/2008 | Lewis | A62B 31/00 128/205.26 |
| 2009/0038618 | A1 * | 2/2009 | Grauke | A61G 10/026 119/416 |
| 2017/0354750 | A1 * | 12/2017 | Geiger | A61L 2/0023 |
| 2018/0133074 | A1 * | 5/2018 | Delise | B62D 33/02 |
| 2020/0330307 | A1 * | 10/2020 | McKeeman | A61G 10/026 |
| 2022/0160565 | A1 * | 5/2022 | Ryder | A61G 10/026 |
| 2022/0160566 | A1 * | 5/2022 | Ryder | A61G 10/026 |

* cited by examiner

SYSTEM AND METHOD FOR A MODULAR HYPERBARIC CHAMBER HAVING A REVERSIBLE SECTION

FIELD OF THE DISCLOSURE

The subject matter of the present disclosure refers generally to a system and method for a modular hyperbaric chamber having a reversible control section.

BACKGROUND

Positioning hyperbaric chambers in a room is a critical aspect of ensuring the safe and effective operation of these medical devices. Several issues need to be considered when determining the appropriate placement of hyperbaric chambers to guarantee the well-being of both patients and healthcare providers. From safety concerns to practical considerations, careful planning is essential to avoid potential risks and optimize the use of these chambers. Several critical aspects of positioning a hyperbaric chamber in a room include, but are not limited to, space requirements, ventilation, electrical safety, access and egress, fire safety, noise control, patient privacy, emergency preparedness, regulatory compliance, maintenance accessibility, and potential impact on other equipment. Unfortunately, the design of currently available hyperbaric chambers makes it difficult for compliance with each of these critical aspects.

For instance, hyperbaric chambers require a significant amount of space for proper installation. Inadequate space can lead to operational difficulties, compromising the functionality and safety of the equipment. Additionally, it may be difficult or impossible to add many currently available hyperbaric chambers to certain locations due to door sizes of many buildings. And even if you do have a space large enough to house the hyperbaric chamber, you must still factor in adequate space around the chamber to allow for easy access for patients and medical personnel, especially during emergencies. Assuming one can find space adequate for housing a hyperbaric chamber, the structural integrity of the room should be carefully evaluated to support the weight of the hyperbaric chamber. Inadequate support can lead to safety hazards and structural damage to the room itself. Additionally, one must consider that structural stability of a building in areas that are used to access the space sufficient to support a hyperbaric chamber.

When the need for proper safety is considered in addition to the size/access constraints of currently available hyperbaric chamber, it further limits where one might install a hyperbaric chamber. Inadequate ventilation can lead to a buildup of heat and moisture, potentially affecting the comfort and well-being of patients undergoing treatment. Potentially worse is that the buildup of moisture and heat could cause pose a danger around electrical sources. And considering that hyperbaric chambers use large quantities of highly flammable oxygen, assessing the risk of fire is essential when positioning hyperbaric chambers. Placing them away from potential sources of ignition and ensuring the availability of fire safety equipment are crucial steps in preventing fire-related accidents. The placement of hyperbaric chambers should allow for easy access during emergencies. This includes ensuring that emergency exits are clear and accessible and that the chambers are not obstructing the path to safety. Further, adherence to regulatory standards and guidelines is paramount when positioning hyperbaric chambers. Compliance ensures that the installation meets the required safety standards and mitigates potential legal and regulatory risks, and may reduce the risk of lawsuit for a service provider.

Other factors that may affect quality of life of operators and/or patients must also be considered when placing a barometric pressure chamber. Maintaining patient privacy is essential during hyperbaric chamber treatments. Placing the chambers in areas that offer adequate privacy and confidentiality is crucial for the comfort and well-being of the patients. However, one must also consider the orientation of the windows of a hyperbaric chamber, which allow for patients to see out of the interior chamber of the hyperbaric chamber and healthcare professional or veterinarians to see inside the interior chamber. Currently available hyperbaric chambers do not have window configurations that may be reoriented, resulting in situations where the window may be facing a wall. This not only may increase the change that a patient becomes claustrophobic, but also poses a safety risk since it makes it more difficult for a healthcare professional or veterinarian to monitor the patient within the interior chamber.

Accordingly, there is a need in the art for a hyperbaric chamber that has a mirrored control system and mirrored window system to increase patient comfort and reduce medical risk. Further, there is a need in the art for a modular system that can greatly increase access to hyperbaric chambers in instances where there may be space constraints.

SUMMARY

A system and method for system and method for a modular hyperbaric chamber having a reversible control section is provided. In one aspect, the system allows a user to change the position of controls on a hyperbaric chamber to either side of the hyperbaric chamber. In another aspect, the system allows either side of a hyperbaric chamber to be positioned against a wall without limiting the functionality of the hyperbaric chamber. In yet another aspect, the system provides a hyperbaric chamber that is modular, allowing for custom length hyperbaric chambers that may be built in areas that might otherwise be inaccessible to non-modular hyperbaric chambers. In yet another aspect, the system provides a hyperbaric chamber having mirrored controls inside and outside of the hyperbaric chamber. Generally, the system and methods of the present disclosure are designed to allow for highly customizable hyperbaric chambers that are not limited by space constraints in the same way that current hyperbaric chambers are. The system comprises a modular cylindrical vessel having a reversible control section, flow control system incorporated into said cylindrical vessel, and a control panel configured to manage said flow control system. The reversible control section allows for the control panels to be oriented on either side of the modular cylindrical vessel. The controls may be incorporated into an exterior control inlet of the reversible control section and/or an interior control inlet of the reversible control section.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises", and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a hyperbaric chamber having mirrored controls.

Figure 1:
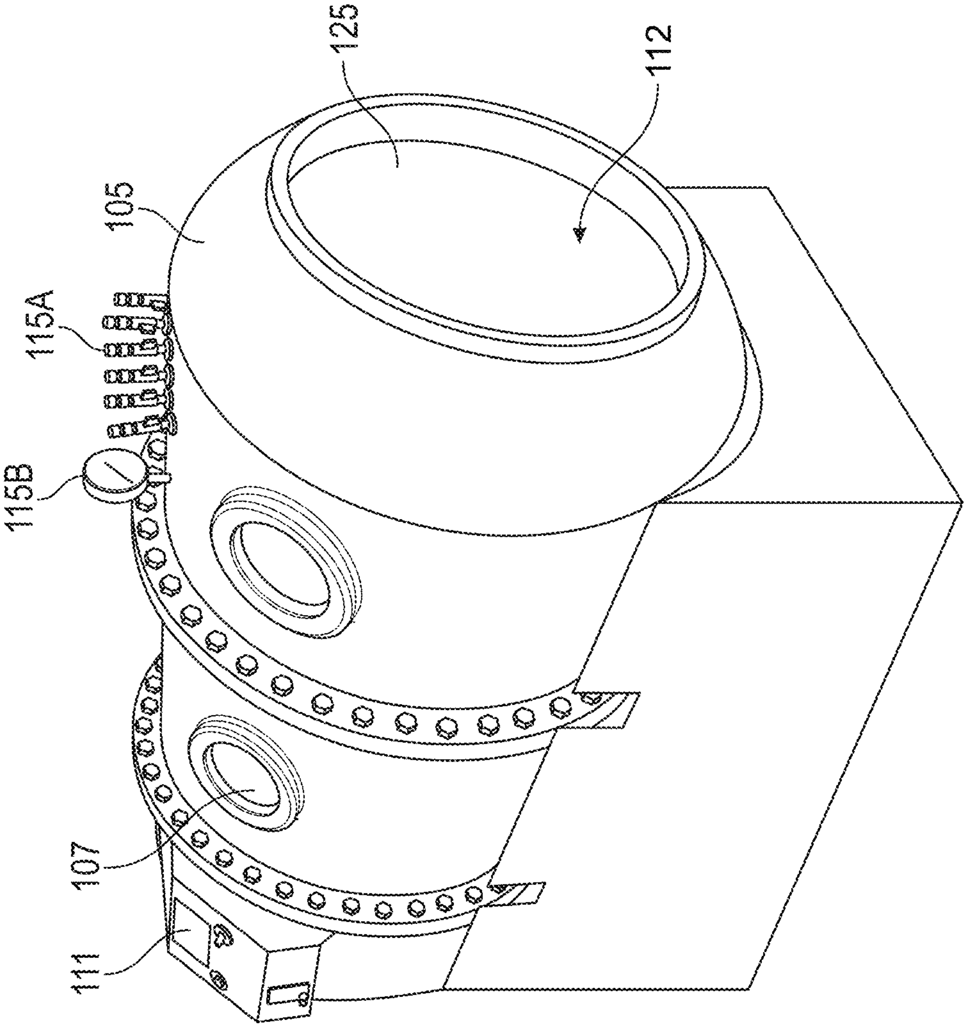
FIG. 1 illustrates a system embodying features consistent with the principles of the present disclosure.
Figure 2:
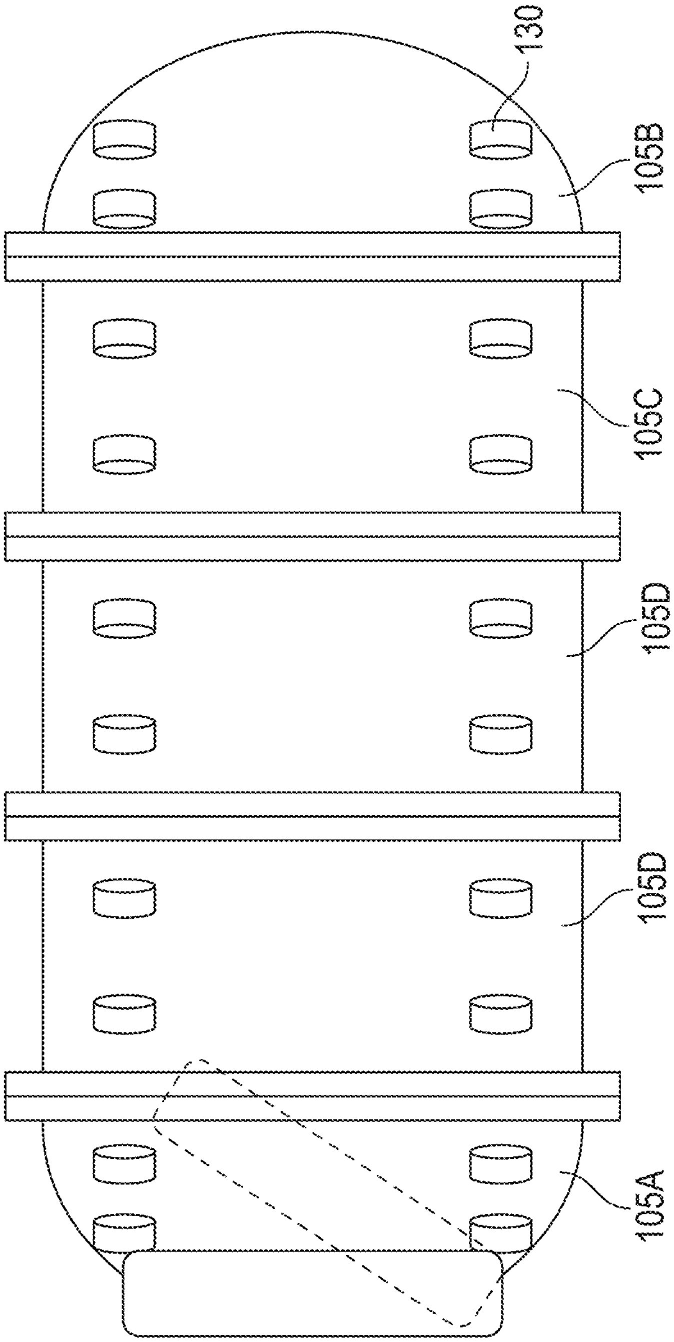
FIG. 2 illustrates a system embodying features consistent with the principles of the present disclosure.
Figure 3:
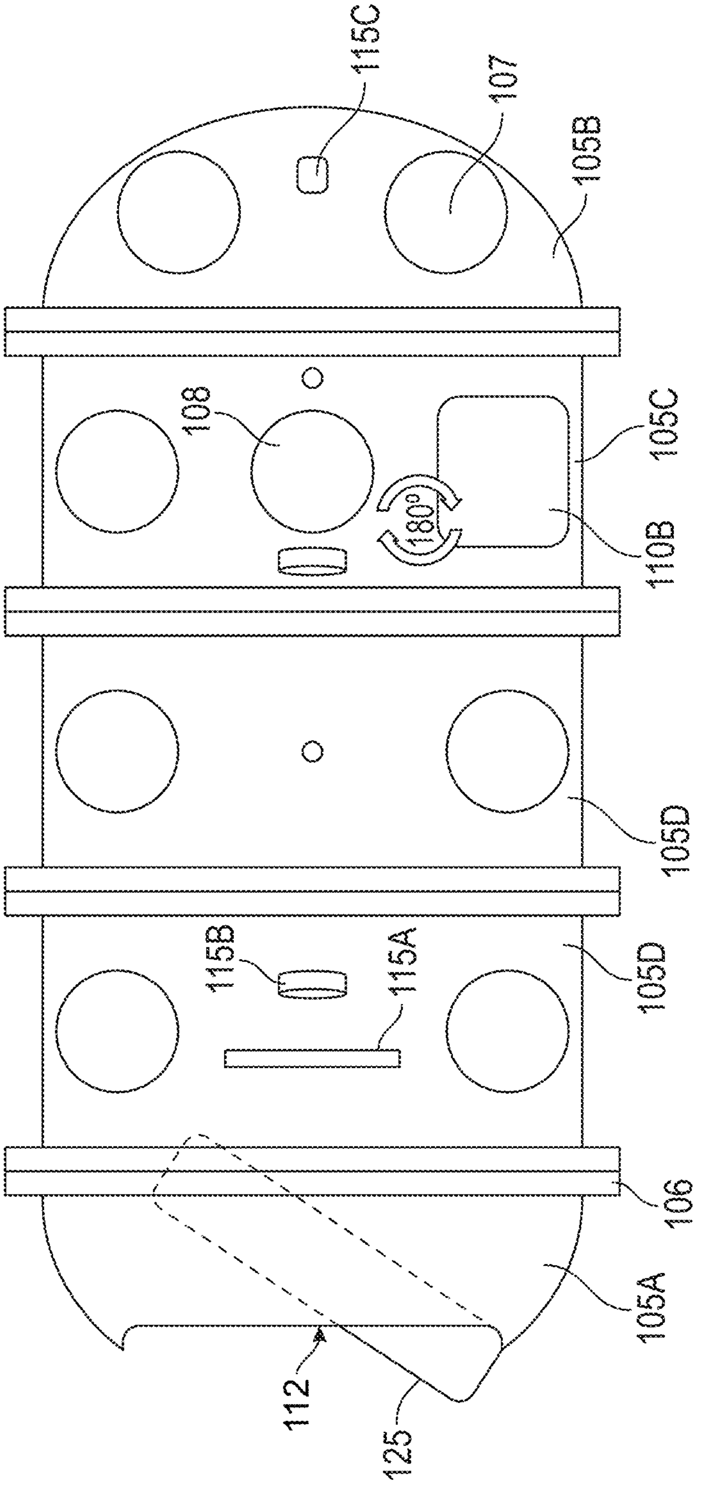
FIG. 3 illustrates a system embodying features consistent with the principles of the present disclosure.
Figure 4:
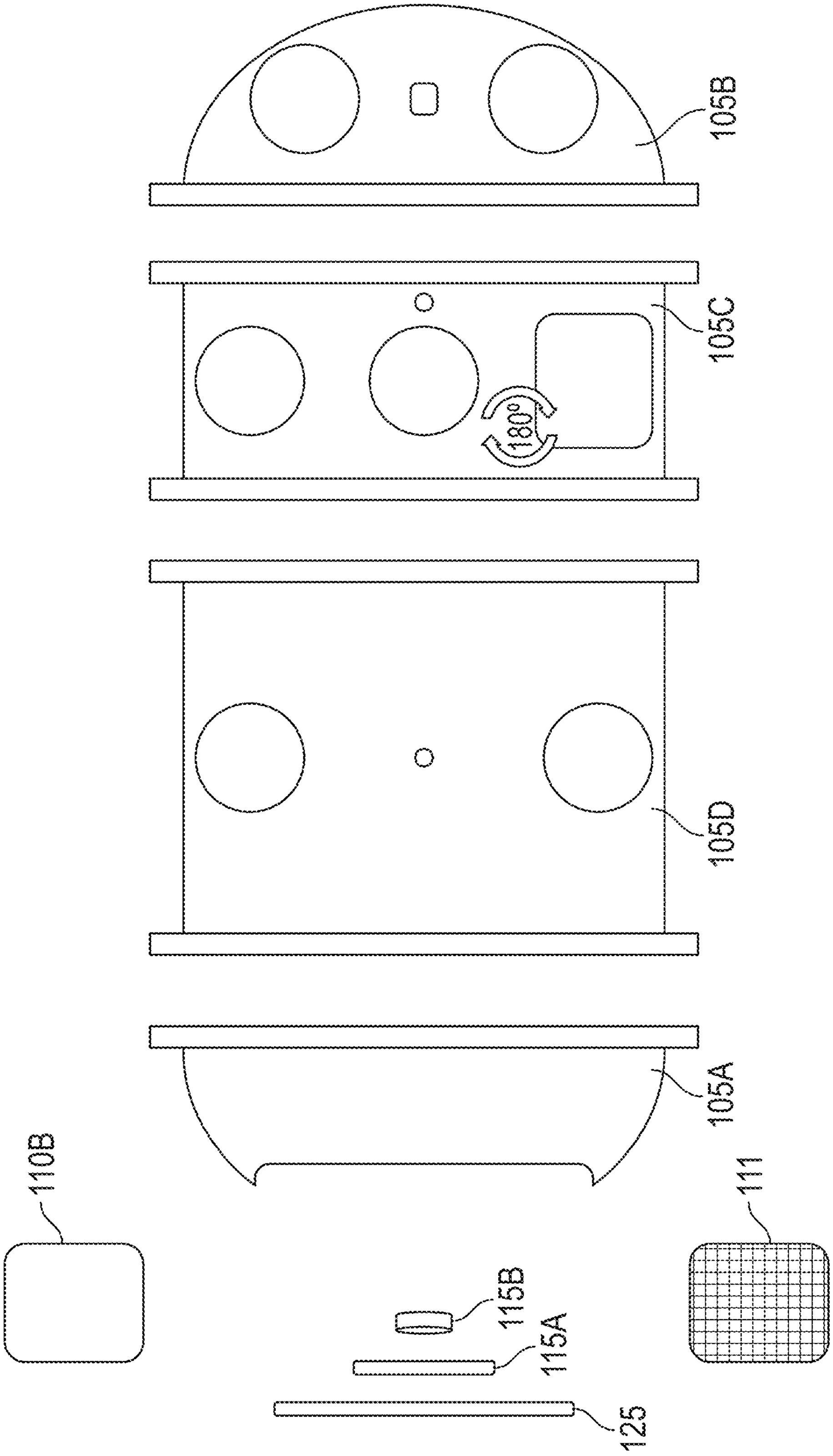
FIG. 4 illustrates a system embodying features consistent with the principles of the present disclosure.
Figure 5:
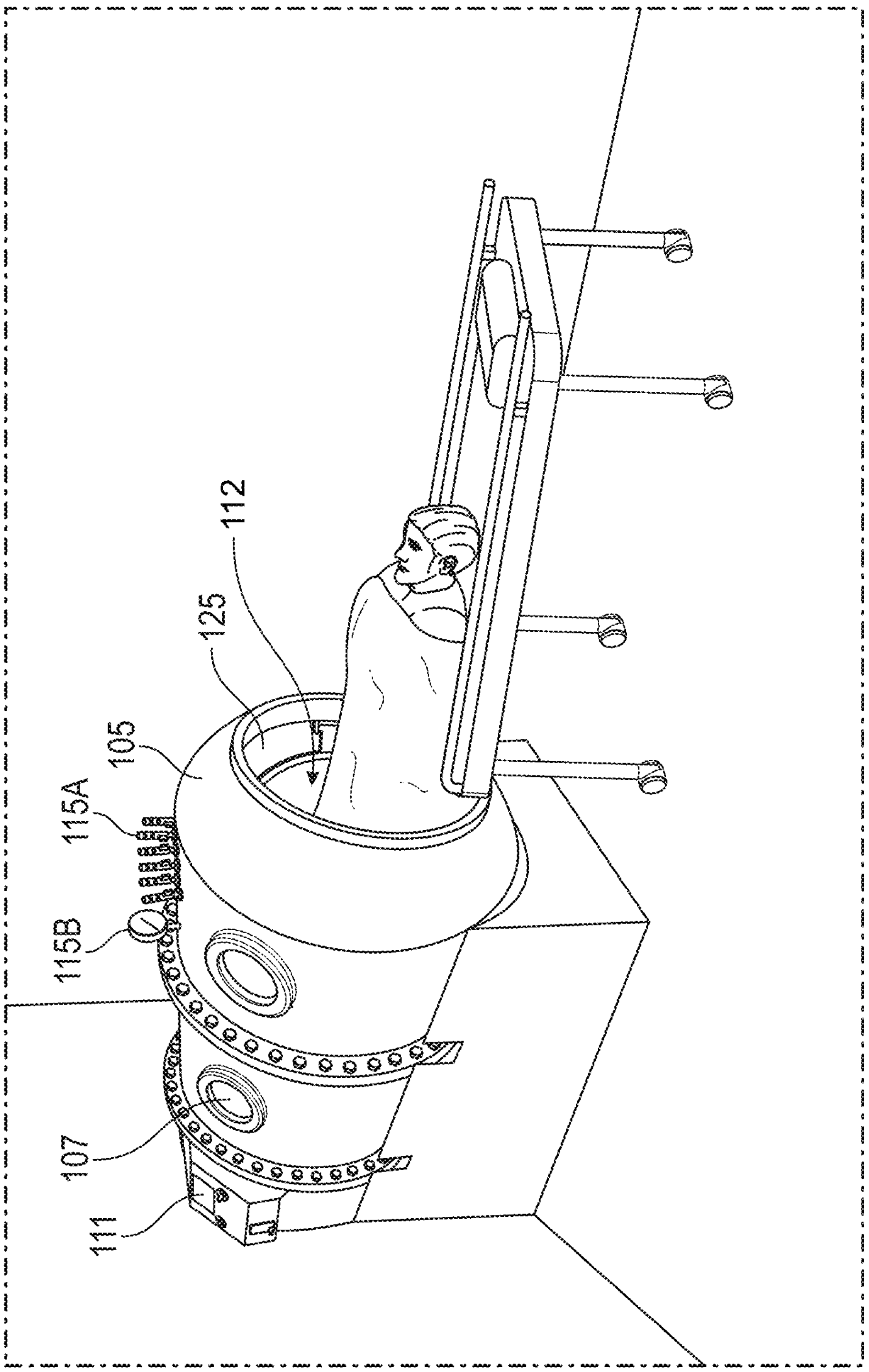
FIG. 5 illustrates a system embodying features consistent with the principles of the present disclosure.
Figure 6:
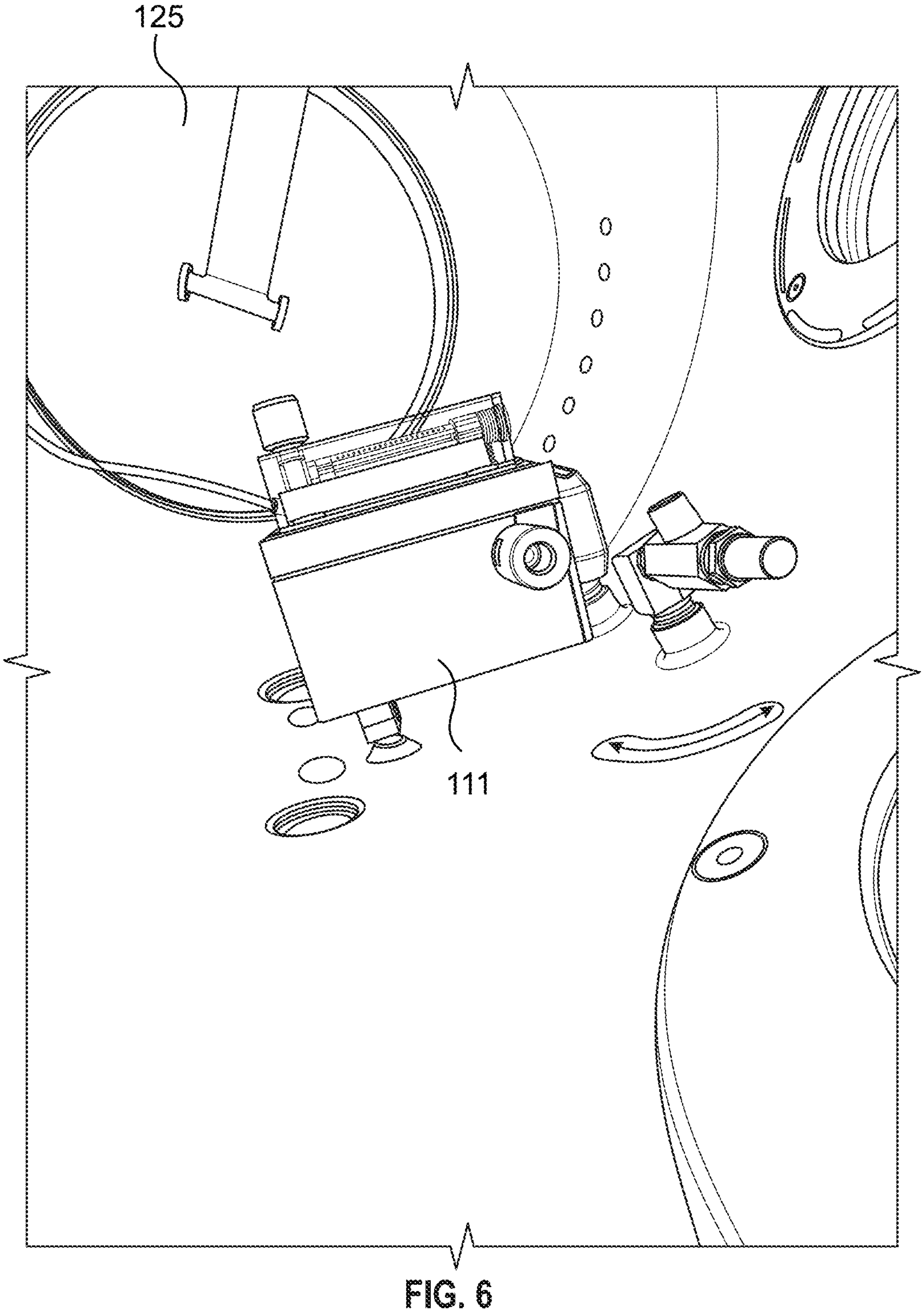
FIG. 6 illustrates a system embodying features consistent with the principles of the present disclosure.
Figure 7:
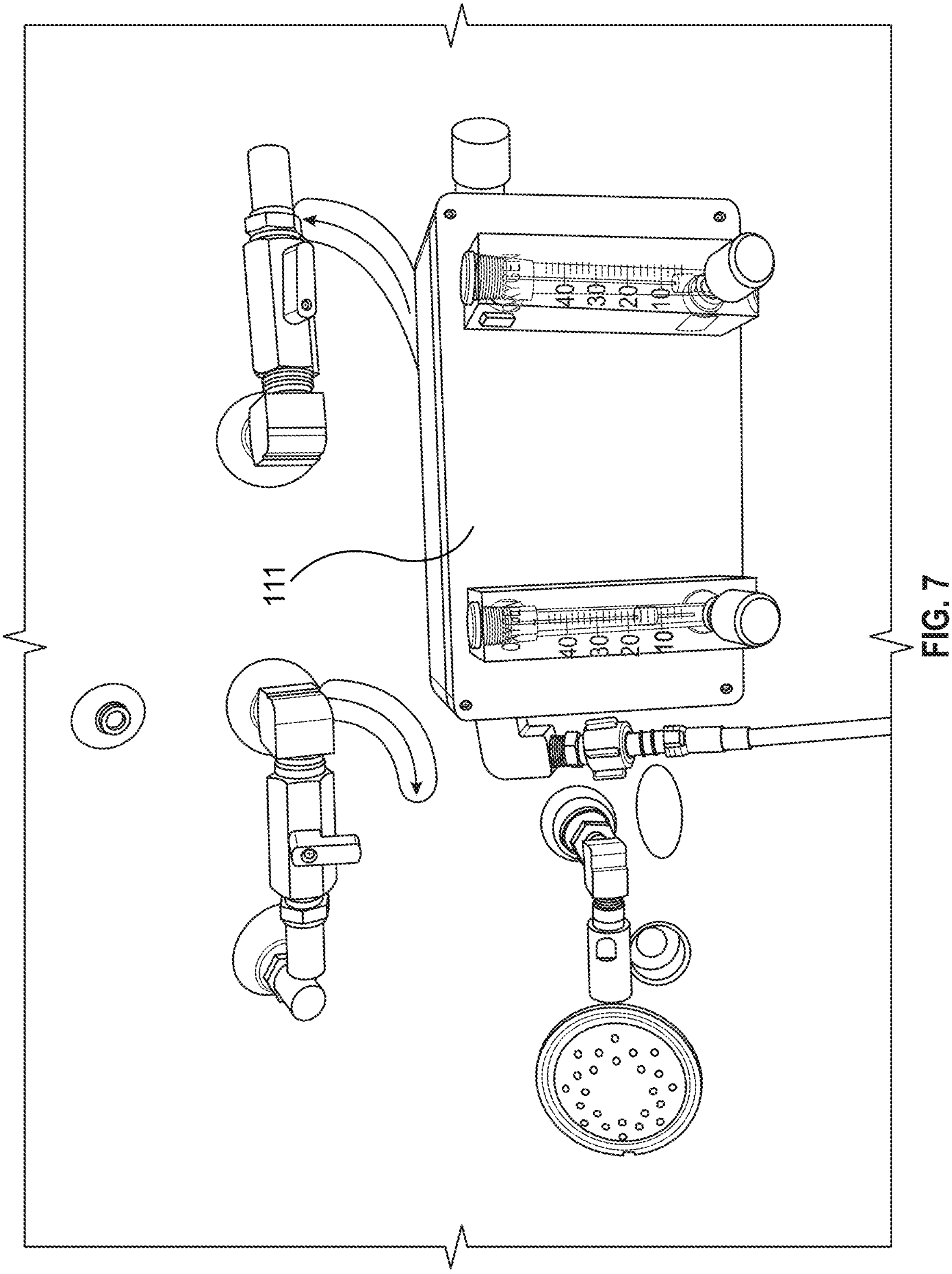
FIG. 7 illustrates a system embodying features consistent with the principles of the present disclosure.
Figure 8:
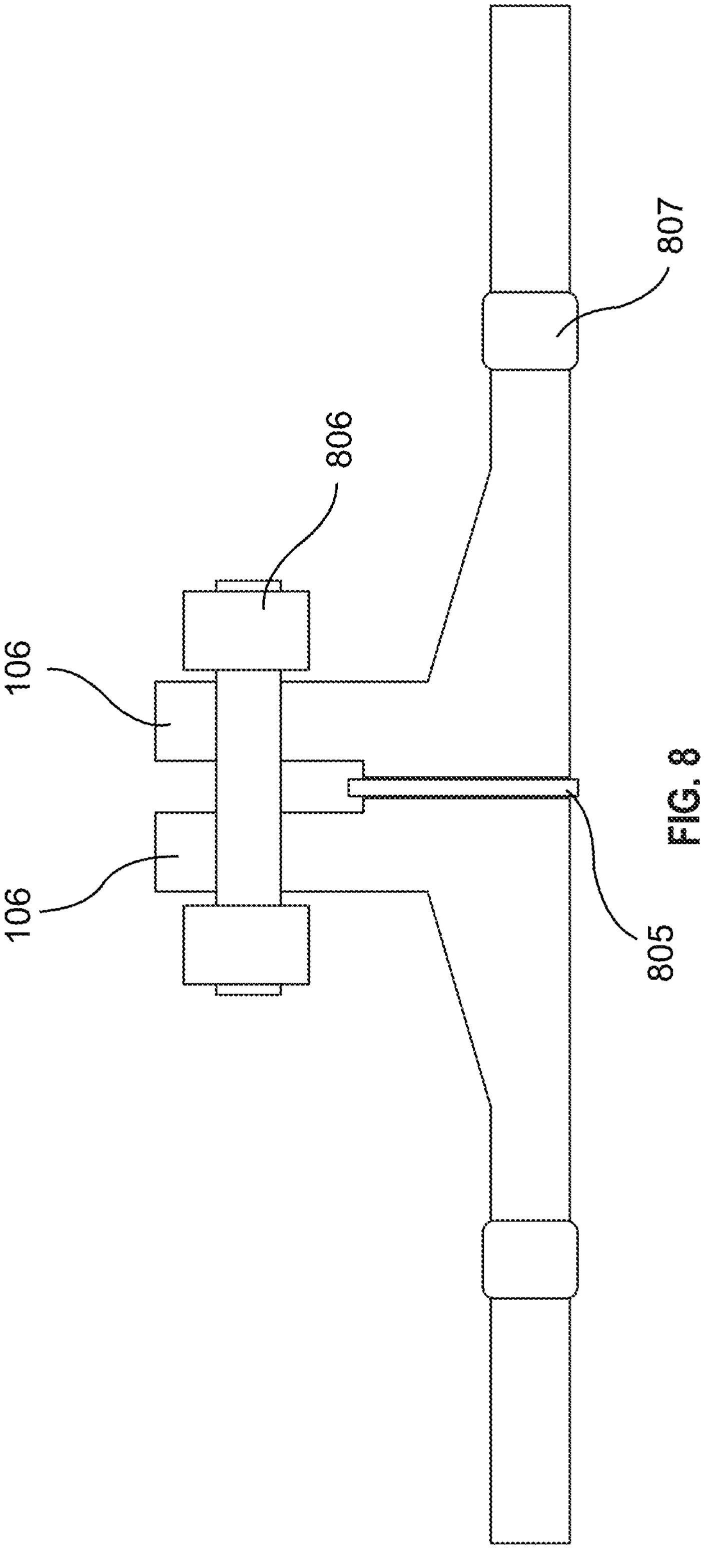
FIG. 8 illustrates a system embodying features consistent with the principles of the present disclosure.

FIGS. 1-8 illustrate embodiments of a modular hyperbaric chamber having a reversible control section and methods for using the modular hyperbaric chamber. FIG. 1 illustrates a perspective view of a preferred embodiment of the modular hyperbaric chamber having a plurality of sections, flow control system 115A-C incorporated into the plurality of sections, and a control panel 111 configured to control said flow control system 115A-C, wherein said plurality of sections comprises at least one reversible control section. FIG. 2 illustrates a top view of a preferred embodiment of the modular hyperbaric chamber having at least one reversible control section, wherein an apex window 108 of said at least one reversible control section allows a subject to see a repositionable pressure gauge 115B secured to an exterior surface of said at least one reversible control section. FIG. 3 illustrates a bottom view of a preferred embodiment of the modular hyperbaric chamber having at least one reversible control section, wherein a plurality of wheels 130 secured to the bottom of the plurality of sections allows for easier movement of said modular hyperbaric chamber. FIG. 4 illustrates a top exploded view of a modular hyperbaric chamber having at least one reversible control section. FIG. 5 illustrates an environmental view of a modular hyperbaric chamber having at least one reversible control section being used by a user and/or operator FIG. 6 illustrates a side view of controls within the interior of a modular hyperbaric chamber. FIG. 7 illustrates a top view of controls within the interior of a modular hyperbaric chamber. FIG. 8 illustrates a side view of flanges 106 used to secure together sections of a modular cylindrical vessel 105.

Generally, the system comprises a modular cylindrical vessel 105 having a plurality of sections, flow control system 115A-C incorporated into said cylindrical vessel 105, and a control panel 111 configured to control said flow control system 115A-C. A reversible control section of the plurality of sections allows for the positioning of a control inlet of the reversible control section to be located on either side of a modular cylindrical vessel 105, which may allow for a control panel 111 to be secured to either side of the modular cylindrical vessel 105. The control panel 111 may be incorporated into an exterior control inlet of the reversible control section and/or an interior control inlet of the reversible control section. In a preferred embodiment, an exterior control inlet is located on the exterior surface of the wall of the reversible control section and an interior control inlet is located on the interior surface of the wall of the reversible control section. In a preferred embodiment, an exterior control inlet and an interior control inlet may be mirrored in a way such that an exterior control inlet and interior control inlet are located opposite one another about the same area of the wall of the cylindrical vessel 105. Accordingly, in some preferred embodiments, the cylindrical vessel 105 may comprise control inlets on both the exterior surface and interior surface of the wall of the reversible control section.

In a preferred embodiment, the plurality of sections used to create the modular cylindrical vessel 105 comprise a cylindrical body section, head section, and door section. In a preferred embodiment, at least one reversible control section makes up a cylindrical body section of the modular cylindrical vessel 105. In some preferred embodiments, at least one reversible control section and at least one midsection make up the cylindrical body section of the modular cylindrical vessel 105. The head section is preferably secured to a first end of the cylindrical body section and the door section is preferably secured to a second end of the cylindrical body section. Accordingly, the head section and door section are always on opposite ends of the cylindrical body section.

In a preferred embodiment, the modular cylindrical vessel 105 is configured to receive air at a pressure greater than one atmosphere within an inner cavity 112. In a preferred embodiment, the modular cylindrical vessel 105 is configured to withstand an internal pressure of at least 3 atmospheres without leaking. In a preferred embodiment, the modular hyperbaric chamber and its various components are configured to withstand internal pressures greater than 4 atmospheres without leaking. The material used to construct the modular cylindrical vessel 105 is preferably carbon steel;

however, one with skill in the art will recognize that other materials suitable for constructing hyperbaric chambers capable of withstanding internal pressures of at least 3 atmospheres may be used without departing from the inventive subject matter as described herein.

An opening of the door section allows for access into the inner cavity 112 created by the cylindrical body section, head section, and door section. A door 125 may be movably secured about the opening of the door section in a way such that the door 125 may move between an open position and a closed position, wherein said door 125 allows access to the opening when in the open position and seals the opening when in a closed position. In a preferred embodiment, the door 125 creates an airtight seal about the opening to prevent gases from escaping the inner cavity 112. The door 125 is preferably configured to open into the inner cavity 112 of the modular cylindrical vessel 105. A buildup of pressure within the inner cavity 112 may prevent the opening of the door 125 during operation of the modular hyperbaric chamber. In some preferred embodiments, a plurality of hand wheel closures may be used to create an air-tight seal between the inner circumferential surface of the door 125 and the opening of the modular cylindrical vessel 105.

Each reversible control section of a modular cylindrical vessel 105 preferably comprises a length between 28 inches and 30 inches. Embodiments comprising a mid-section preferably comprise a mid-section having a length between 28 inches and 30 inches. In a preferred embodiment, the head section and door section preferably each comprise a length between 14 inches and 18 inches. Accordingly, a modular cylindrical vessel 105 comprising a reversible control section, mid-section, head section, and door section preferably comprises a length between 84 inches and 96 inches. However, one with skill in the art will understand that the various sections may comprise other lengths without departing from the inventive subject matter described herein. For instance, a reversible control section and mid-section may comprise a length shorter than 28 inches or greater than 30 inches without departing from the inventive subject matter described herein. Or the head section and the door section may comprise a length shorter than 14 inches or greater than 18 inches without departing from the inventive subject matter described herein.

Additionally, the modular cylindrical vessel 105 preferably comprises a diameter between 36 inches and 48 inches, wherein the diameter of the inner cavity 112 created by a modular cylindrical vessel 105 having said diameters is large enough for an average size adult to fit therein. However, one with skill in the art will recognize that the modular cylindrical vessel 105 may comprise other diameters without departing from the inventive subject matter described herein. For instance, a modular cylindrical vessel 105 may comprise a diameter of 72 inches, wherein an inner cavity 112 of said modular cylindrical vessel 105 is large enough that an average size human may sit comfortably in a standard table chair located within said inner cavity 112. In a preferred embodiment, each section of the plurality of sections used to create a modular cylindrical vessel 105 comprises the same diameter at a widest point. Accordingly, a cylindrical body section having a diameter of 36 inches will also comprise a head section and a door section having a diameter of 36 inches.

The various sections of the modular cylindrical vessel 105 are preferably secured together in a way that prevents gases from escaping the inner cavity 112 created by the plurality of sections. In one preferred embodiment, the various sections of the modular cylindrical vessel 105 may be welded together until they form an air tight seal. In another preferred embodiment, as illustrated in FIGS. 1-8, the mid-section, head section, and door section may comprise one or more flanges 106, wherein said flanges 106 are oriented in a way such that they may be used to secure the various sections to one another. Accordingly, the flanges 106 are preferably positioned about the various sections in a way such that the bolt holes/threads of the flanges 106 align when the sections are positioned in a linear manner respective to one another, as illustrated in FIG. 8. Accordingly, in a preferred embodiment, the flanges 106 are perpendicularly arranged about the plurality of sections of the modular cylindrical vessel 105, allowing for the alignment of bolt holes/threads of the flanges 106. In a preferred embodiment, high strength bolts 806 positioned in the bolt holes of the flanges 106 are used to secure the plurality of sections of the modular cylindrical vessel 105 in place.

Types of flanges 106 that may be used by the modular cylindrical vessel 105 include, but are not limited to, slip-on flange, weld neck flange, overlapping flange, threaded flange, socket weld flange, or any combination thereof. Additionally, in some preferred embodiments, the flanges 106 used for securing sections to one another may include different types of flange sealing surfaces, including, but not limited to, raised surfaces, flat sealing surfaces, RTJ joints, and tongue and groove flanges. In a preferred embodiment, class 150, full penetration, ASME/PVHO-1 code compliant, butt welded (weld neck flange) vertical pipe flanges with a raised face or a flat face may be used for bolted connections between the plurality of sections of the modular cylindrical vessel 105. All welds are preferably full penetration welds due to the ASME/PVHO-1 code.

In some preferred embodiments, a gasket 805 may be used between the flanges 106 to increase air tightness between the plurality of sections. Types of materials that may be used for the gaskets 805 include, but are not limited to, paper, fiber, rubber, silicone, metal, cork, felt, neoprene, nitrile rubber, fiberglass, polytetrafluoroethylene, and plastic polymer, or any combination thereof. In a preferred embodiment, the gasket 805 comprises fiber. The flanges 106 and sections of the modular cylindrical vessel 105 are preferably constructed of steel and configured to withstand at least 3 atmospheres of internal pressure without leaking. As such, the gaskets 805 are preferably compressed between the flanges 106 of the plurality of sections by an amount that may allow for air tightness of at least 3 atmospheres, which may vary depending on the material used for the gasket 805. One with skill in the art will understand that different gasket materials may require different compression to achieve air tightness at 3 or more atmosphere.

In a preferred embodiment, the securement of the mid-section, reversible section, head section, and door section of the modular cylindrical vessel 105 is achieved through the use of a plurality of flanges 106 that have been connected via a weld 807 to said sections and are integral to the structural integrity and airtight seal of the hyperbaric chamber. These flanges 106 are precision-engineered components that are affixed to the ends of each section, designed to interlock when the sections are brought into alignment. In a preferred embodiment, the flanges 106 feature a series of bolt holes that are uniformly spaced around their perimeter, ensuring that when two sections are positioned end-to-end, the bolt holes of the adjoining flanges 106 align perfectly. This alignment is a pivotal aspect of the assembly process, as it allows for the insertion of high-strength bolts 806 that will fasten the sections together securely. To facilitate the securement process, the flanges 106 are preferably oriented with their bolt holes or threads in a matching pattern, which is consistent across all sections of the cylindrical vessel 105. This standardization of flange design ensures that any mid-section can be attached to any head section or door section without concern for misalignment, thereby simplifying the construction and maintenance of the hyperbaric chamber. The flanges 106 themselves are robustly constructed, often made from the same high-grade steel as the vessel sections, to withstand the forces exerted by the pressurized environment within the chamber.

In a preferred embodiment, the bolting process involves aligning the flanges 106 of two sections and inserting bolts 806 through the aligned holes, which are then fastened with nuts on the opposite side. This creates a strong mechanical joint that holds the sections together under pressure. The bolts 806 are typically torqued to a specified value to ensure a consistent and reliable seal across all joints. The use of a torque wrench is recommended to achieve the precise level of tightness, preventing leaks while avoiding damage to the flange surfaces or bolt threads. In a preferred embodiment, the bolts 806 are torqued to a value great enough to prevent the escape of pressurized gas of at least 3 atmospheres within the inner cavity 112 from between the reversible section and mid-section and at least one of the head section and/or door section. As previously mentioned, in some embodiments, a gasket 805 may be used between the flanges 106 to enhance the airtight seal. The gasket 805 is preferably sized to match the flange faces, with holes that align with the bolt holes, ensuring that it remains in place during assembly. When the bolts 806 are tightened, the gasket 805 is compressed, forming the additional seal that is capable of maintaining the internal pressure of the hyperbaric chamber without any leakage.

As illustrated in FIGS. 1-8, a plurality of windows 107 is preferably incorporated into the walls of the plurality of sections to allow for viewing into and/or out of the inner cavity 112 of the modular cylindrical vessel 105. In a preferred embodiment, the plurality of windows 107 is airtight to prevent the escape of gas from the inner cavity 112 when the barometric pressure within the cylindrical vessel 105 is greater than one atmosphere. The plurality of windows 107 is preferably configured to withstand at least 3 atmospheres of internal pressure without leaking. In a preferred embodiment, the plurality of windows 107 of mid-section and head section are mirrored, as illustrated in FIGS. 1, 3-5, such that a user may view into the inner cavity 112 regardless of situations in which one side of the modular cylindrical vessel 105 is abutted against a wall. In another preferred embodiment, as illustrated in FIG. 4, an apex window 108 may be incorporated into the wall of the reversible control section at an apex point of the modular cylindrical vessel 105 to allow for a subject to view an exterior pressure gauge 115B of the flow control system 115A-C. In some preferred embodiments, a threaded port allows for the installation of a repositionable pressure gauge 115B about the plurality of windows 107 to allow a subject to view the internal pressure within the inner cavity 112 of the modular cylindrical vessel 105. In one preferred embodiment, two or more threaded ports may be situated about the plurality of windows 107 to allow for the repositioning of the pressure gauge 115B to suit a subject's needs. As illustrated in FIG. 4, threaded ports may be situated about a single window of the plurality of windows 107.

The plurality of windows 107 of the hyperbaric chamber may be constructed from durable materials such as acrylic, which offers clarity and resistance to high pressure. Alternatively, polycarbonate can be used for its high impact strength and ability to withstand pressure fluctuations. For enhanced safety, laminated glass, consisting of multiple layers bonded with interlayers, can be employed to prevent shattering. Tempered glass is another suitable material, known for its toughness and safety as it crumbles into small granular chunks instead of splintering into jagged shards when broken. Borosilicate glass, recognized for its thermal resistance, is also a viable option for the windows, ensuring stability under varying temperature conditions within the chamber. Lastly, fused silica glass may be considered for its exceptional optical clarity and resistance to high pressures, making it ideal for viewing purposes in hyperbaric environments.

As illustrated in FIG. 2, The mobility of the hyperbaric chamber is greatly enhanced by the incorporation of a plurality of wheels 130 affixed to its base, which are designed to facilitate the effortless relocation of the chamber within a facility. In a preferred embodiment, these wheels 130 are mounted on a plurality of legs that are secured to the bottom of the cylindrical vessel 105, ensuring a stable and reliable means of transport. In a preferred embodiment, the chamber utilizes caster-type wheels, which provide the advantage of 360-degree rotation, allowing for smooth and precise maneuvering in various directions. This feature is particularly beneficial in tight spaces or when navigating through corridors and doorways, as it allows for greater flexibility in the chamber's placement. The plurality of wheels 130 and legs are preferably engineered to support the weight of the chamber, ensuring safe and smooth movement without compromising the structural integrity of the vessel. The addition of mobility options underscores the hyperbaric chamber's design focus on operational efficiency and adaptability to the dynamic requirements of healthcare environments.

The amount of pressurized oxygen that flows to the mask used by the patient within the hyperbaric chamber and the pressurized air within the inner cavity 112 of the hyperbaric chamber are generally controlled by the controls of the flow control system 115A-C, which are mounted within the housing. The flow control system 115A-C may be defined as a sophisticated air flow assembly designed to regulate the introduction and maintenance of pressurized pressurized oxygen that flows to the mask used by the patient within the hyperbaric chamber and the pressurized air within the inner cavity 112 of the hyperbaric chamber. This flow control system 115A-C is integral to the operation of the hyperbaric chamber, as it ensures the precise control of environmental conditions within the inner cavity 112, which is essential for therapeutic efficacy. In a preferred embodiment, the flow control system 115A-C includes a series of inlet valves 115A, regulators, and gauges/sensors 115B that work in concert to monitor and adjust the flow of oxygen and pressurized air, maintaining the desired internal pressure levels that are therapeutic for the patient. The flow control system 115A-C is operably connected to an oxygen gas supply and air supply in a way such that it may transfer oxygen from the oxygen gas supply and into mask and/or transfer pressurized air from the air supply and into the inner cavity 112 of the hyperbaric chamber via inlet ports of said cylindrical vessel 105. Because the cylindrical vessel 105 is air tight, the inflow of pressurized air into the inner cavity 112 of the hyperbaric chamber causes said inner cavity 112 to pressurize. The components of the flow control system 115A-C are preferably engineered to handle the high pressures involved in hyperbaric treatments.

The controls allow the user of the system to set specific parameters for each treatment session to finely tune the oxygen levels and pressure within the chamber. The controls interface with the flow control system 115A-C to initiate the pressurization process, maintain steady-state conditions, and safely depressurize the chamber upon completion of the session. In some preferred embodiments, the controls may include digital displays and input devices to provide real-time feedback and adjustments, ensuring that the hyperbaric chamber operates within the prescribed therapeutic ranges. FIGS. 1 and 5 illustrate an embodiment having reversible controls secured to the exterior of the wall of the reversible section whereas FIGS. 6 and 7 illustrate an embodiment having reversible controls secured to the interior of the wall of the reversible section. In some preferred embodiments, reversible controls may be secured to the wall of the reversible section both internally and externally.

In a preferred embodiment, safety features may be embedded within the flow control system 115A-C to protect both the patient and the chamber from over-pressurization or other potential hazards. Types of safety features that may be included in the flow control system 115A-C include, but are not limited to, overpressure relief safety valves 115C, emergency shut-off mechanisms, and alarms that activate when parameters exceed safe limits. In a preferred embodiment, the flow control system 115A-C is designed to be fail-safe, automatically taking corrective action if abnormal conditions are detected. In one preferred embodiment, the flow control system 115A-C is operably connected to an outlet port of the cylindrical vessel 105 in a way such that the flow control system 115A-C may remove air from the inner cavity 112 of the cylindrical vessel 105, thus causing the inner cavity 112 to depressurize. In another preferred embodiment, the cylindrical vessel 105 may comprise a over pressure relief safety valve 115C, which may allow a user to quickly depressurize the inner cavity 112 of the cylindrical vessel 105. Accordingly, safety features may be used to ensure that the hyperbaric chamber remains a secure environment for patients throughout the duration of their treatment, providing peace of mind for healthcare providers and patients alike.

As previously mentioned, the control panel 111 is preferrable secured to the interior surface and/or exterior surface of the wall of the cylindrical vessel 105 via a control inlet. The control inlet preferably comprises inlet ports that may be used to secure the control panel 111. In a preferred embodiment, the control panel 111 comprises a housing and a plurality of controls, wherein the housing is configured to secure to the control inlet of cylindrical vessel 105. An inlet plate 110B may be used to cover a control inlet having no housing secured thereto. In a preferred embodiment, steel plugs may be inserted into control ports of a control inlet not having a control panel 111 secured thereto.

The control inlets are a pivotal feature of the cylindrical vessel 105, designed to enhance the flexibility and functionality of the hyperbaric chamber. In a preferred embodiment these inlets are strategically positioned on the interior and/or exterior surfaces of the chamber wall such that they mirror one another, allowing for the attachment of control panel 111*s* on either side. Accordingly, the arrangement of the control inlets on both the interior and exterior of the wall of the cylindrical vessel 105 means that controls can be accessed from within the chamber by a patient as well as from the outside by an operator. Therefore, and the reversibility of the reversible section addresses the challenge of limited space and specific room configurations since the reversible section can be oriented such that full operational control is maintained regardless of the position of the hyperbaric chamber against walls within a facility.

In a preferred embodiment, the housing of the control panel 111 is designed to interface seamlessly with the control inlet, ensuring a secure attachment that is both robust and user-friendly. Each control inlet is preferably equipped with a standardized mounting system, which includes a series of inlet ports strategically positioned to align with corresponding attachment points on the housing of the control panel 111. The inlet ports may feature threaded interiors or other mechanical fastening systems, such as quick-release latches or locking mechanisms, to facilitate a secure and reversible connection. This design allows for the control panel 111 to be attached or detached with ease, providing flexibility in the configuration and maintenance of the hyperbaric chamber's control systems.

To enhance the versatility of the hyperbaric chamber, the control panel 111 housing is preferably constructed with a modular attachment interface that is compatible with the control inlets on both the interior and exterior surfaces of the cylindrical vessel 105. The housing includes a backplate with multiple pre-formed attachment points that correspond to the inlet ports on the control inlets. When installing the control panel 111, the backplate is positioned against the control inlet, and fasteners are inserted through the attachment points into the inlet ports, securing the housing in place. This arrangement ensures that the control panel 111 remains firmly attached during operation, while also allowing for quick removal or repositioning of the control panel 111 to another control inlet as desired, thereby maintaining the functionality and accessibility of the hyperbaric chamber's controls.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system for a modular hyperbaric chamber having reversible controls comprising:

a modular cylindrical vessel having a cylindrical body section, head section, and door section, wherein said cylindrical body section comprises a reversible control section, wherein said reversible control section, head section, and door section are linearly aligned and secured together to create said modular cylindrical vessel, wherein a plurality of mirrored windows of said head section allows a subject within said inner cavity to see to an exterior area of said cylindrical vessel, wherein a mirrored control inlet is positioned on a first side of a wall of said reversible control section, wherein said mirrored control inlet is located on an exterior surface of said wall of said reversible control section and an interior surface of said wall of said reversible control section, wherein a window of said reversible control section is positioned on a second side of said wall of said reversible control section, wherein said mirrored control inlet of said reversible control section is not positioned on said second side and wherein said window of said reversible control section is not located on said first side, wherein said reversible control section is rotatable 180 degrees in relation to said head section and said door section and able to form said cylindrical body section, wherein turning said reversible control section 180 degrees changes which side of said modular cylindrical vessel that said reversible control section is positioned, wherein said modular cylindrical vessel comprises an inner cavity accessible via a door of said door section, wherein said door is configured to seal an opening of said door section when said door is in a closed position, wherein said modular cylindrical vessel maintains a pressure of at least 3 atmospheres when said door is in said closed position, a flow control system secured to said modular cylindrical vessel and configured to transfer oxygen from an oxygen source into said inner cavity, a control panel having a housing and a plurality of controls, wherein said control panel is operably connected to said flow control system, wherein said control panel is configured to secure to said wall of said modular cylindrical vessel via said mirrored control inlet.

2. The system of claim 1, wherein said cylindrical body section further comprises at least one mid-section.

3. The system of claim 2, wherein said at least one mid-section further comprises said mirrored windows.

4. The system of claim 1, further comprising an apex window located between said window and said mirrored control inlet of said reversible control section.

5. The system of claim 1, wherein said cylindrical body section, head section, and door section are secured via a plurality of flanges, wherein said plurality of flanges are oriented perpendicularly to an axis of alignment of said cylindrical body section, head section, and door section, wherein at least one of bolt holes or threads of said plurality of flanges align.

6. The system of claim 5, further comprising a plurality of bolts, wherein said plurality of bolts are configured to fit within said bolt holes and secure said head section and door section to said cylindrical body section.

7. The system of claim 1, further comprising a gasket configured to create an air tight seal between said cylindrical body section, head section, and door section.

8. The system of claim 1, further comprising a panel configured to secure to a control inlet of said mirrored control inlet when said control panel is not secured to said control inlet.

9. The system of claim 8, further comprising a plurality of inlet ports of said control inlet, wherein said housing of said control panel is configured to secure to said modular cylindrical vessel via said plurality of inlet ports.

10. The system of claim 9, further comprising a plurality of plugs, wherein said plurality of plugs fill said plurality of inlet ports of each said control inlet of said plurality of control inlets when said control panel is not secured to said control inlet.

11. The system of claim 1, further comprising a repositionable gauge operably connected to said modular cylindrical vessel and configured to measure said pressure within said inner cavity, wherein said repositionable gauge is secured to said modular cylindrical vessel via at least one threaded port.

12. A system for a modular hyperbaric chamber having reversible controls comprising:

a modular cylindrical vessel having a cylindrical body section, head section, and door section, wherein said cylindrical body section comprises a reversible control section and at least one mid-section, wherein said reversible control section, at least one mid-section, head section, and door section are linearly aligned and secured together to create said modular cylindrical vessel, wherein a plurality of mirrored windows of said head section and said mid-section allows a subject within said inner cavity to see to an exterior area of said cylindrical vessel, wherein a mirrored control inlet is positioned on a first side of a wall of said reversible control section, wherein said mirrored control inlet is located on an exterior surface of said wall of said reversible control section and an interior surface of said wall of said reversible control section, wherein a window of said reversible control section is positioned on a second side of said wall of said reversible control section, wherein said mirrored control inlet of said reversible control section is not positioned on said second side and wherein said window of said reversible control section is not located on said first side, wherein said reversible control section is rotatable 180 degrees in relation to said head section and said door section and able to form said cylindrical body section, wherein turning said reversible control section 180 degrees in relation to said head section and said door section changes which side of said modular cylindrical vessel that said reversible control section is positioned, wherein said modular cylindrical vessel comprises an inner cavity accessible via a door of said door section, wherein said door is configured to seal an opening of said door section when said door is in a closed position, wherein said modular cylindrical vessel maintains a pressure of at least 3 atmospheres when said door is in said closed position, wherein said cylindrical body section, head section, and door section are linearly aligned, wherein said cylindrical body section, head section, and door section comprise a plurality of flanges that are oriented perpendicularly to an axis of alignment of said cylindrical body section, head section, and door section, wherein at least one of bolt holes or threads of said plurality of flanges are configured to align when said cylindrical body section, head section, and door section are linearly aligned, a gasket configured to assist with creating an air tight seal between said cylindrical body section, head section, and door section, a repositionable gauge operably connected to said modular cylindrical vessel and configured to measure said pressure within said inner cavity, wherein said repositionable gauge is secured to said modular cylindrical vessel via at least one threaded port, a flow control system secured to said modular cylindrical vessel and configured to transfer oxygen from an oxygen source into said inner cavity, a control panel having a housing and a plurality of controls, wherein said control panel is operably connected to said flow control system, wherein said control panel is configured to secure to said wall of said modular cylindrical vessel via said mirrored control inlet.

13. The system of claim 12, further comprising an apex window located between said window and said mirrored control inlet of said reversible control section.

14. The system of claim 12, wherein said at least one threaded port is positioned about said apex window.

15. The system of claim 12, further comprising a plurality of bolts, wherein said plurality of bolts are configured to fit within said bolt holes and secure said head section and door section to said cylindrical body section.

16. The system of claim 12, further comprising a panel configured to secure to a control inlet of said mirrored control inlet when said control panel is not secured to said control inlet.

17. The system of claim 16, further comprising a plurality of inlet ports of said control inlet, wherein said housing of said control panel is configured to secure to said modular cylindrical vessel via said plurality of inlet ports.

18. The system of claim 17, further comprising a plurality of plugs, wherein said plurality of plugs fill said plurality of inlet ports of each said control inlet of said plurality of control inlets when said control panel is not secured to said control inlet.

19. A system for a modular hyperbaric chamber having reversible controls comprising:

a modular cylindrical vessel having a cylindrical body section, head section, and door section, wherein said cylindrical body section comprises a reversible control section and at least one mid-section, wherein said reversible control section, at least one mid-section, head section, and door section are linearly aligned and secured together to create said modular cylindrical vessel, wherein a plurality of mirrored windows of said head section and said mid-section allows a subject within said inner cavity to see to an exterior area of said cylindrical vessel, wherein a mirrored control inlet is positioned on a first side of a wall of said reversible control section, wherein said mirrored control inlet is located on an exterior surface of said wall of said reversible control section and an interior surface of said wall of said reversible control section, wherein a window of said reversible control section is positioned on a second side of said wall of said reversible control section, wherein said mirrored control inlet of said reversible control section is not positioned on said second side and wherein said window of said reversible control section is not located on said first side, wherein said reversible control section is rotatable 180 degrees in relation to said head section and said door section and able to form said cylindrical body section, wherein turning said reversible control section 180 degrees in relation to said head section and said door section changes which side of said modular cylindrical vessel that said reversible control section is positioned, wherein rotating said reversible control section 180 degrees changes an orientation of said modular cylindrical vessel, wherein said modular cylindrical vessel comprises an inner cavity accessible via a door of said door section, wherein said door is configured to seal an opening of said door section when said door is in a closed position, wherein said modular cylindrical vessel maintains a pressure of at least 3 atmospheres when said door is in said closed position, wherein said cylindrical body section, head section, and door section are linearly aligned, wherein said cylindrical body section, head section, and door section comprise a plurality of flanges that are oriented perpendicularly to an axis of alignment of said cylindrical body section, head section, and door section, wherein at least one of bolt holes of said plurality of flanges are configured to align when said cylindrical body section, head section, and door section are linearly aligned, a plurality of bolts configured to fit within said bolt holes and secure said head section and door section to said cylindrical body section, a gasket configured to assist with creating an air tight seal between said cylindrical body section, head section, and door section, a repositionable gauge operably connected to said modular cylindrical vessel and configured to measure said pressure within said inner cavity, wherein said repositionable gauge is secured to said modular cylindrical vessel via at least one threaded port, a flow control system secured to said modular cylindrical vessel and configured to transfer oxygen from an oxygen source into said inner cavity, a control panel having a housing and a plurality of controls, wherein said control panel is operably connected to said flow control system, wherein said control panel is configured to secure to said wall of said modular cylindrical vessel via said mirrored control inlet.

20. The system of claim 19, further comprising an apex window located between said window and said mirrored control inlet of said reversible control section.

* * * * *